C. P. STEINMETZ.
ALTERNATING CURRENT RECTIFYING APPARATUS.
APPLICATION FILED MAR. 23, 1903.

1,095,170.

Patented Apr. 28, 1914.

Witnesses

Inventor
Charles P. Steinmetz
by
His Attorney

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT-RECTIFYING APPARATUS.

1,095,170. Specification of Letters Patent. Patented Apr. 28, 1914.

Application filed March 23, 1903. Serial No. 149.112.

*To all whom it may concern:*

Be it known that I, CHARLES P. STEINMETZ, a citizen of the United States, residing at Schenectady, county of Schenectady, State of New York, have invented certain new and useful Improvements in Alternating-Current-Rectifying Apparatus, of which the following is a specification.

My invention relates to the rectification of alternating current and comprises means whereby current either of high or low voltage may be rectified without the use of any apparatus with moving parts.

My invention contemplates more especially the rectification of multiphase alternating currents though it is to be understood that certain of its features of novelty are applicable also to single phase alternating current systems. When the rectification of multiphase alternating current is undertaken, I derive from each phase of the system a series of current impulses of a single polarity, the impulses or half waves being of the same polarity for all of the phases. These half waves I combine to produce a substantially uniform resulting current. Due to the phase displacement of the waves in the different phases of the system, the maxima and minima of the half waves occur in overlapping sequence, so that the sum of the instantaneous values of all the half waves taken together is practically constant.

For a more detailed understanding of my invention reference is to be had to the following specification taken in connection with the accompanying drawings in which—

Figure 1:
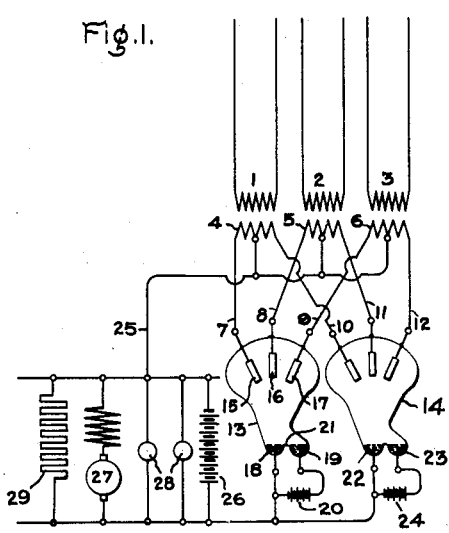
Figure 2:
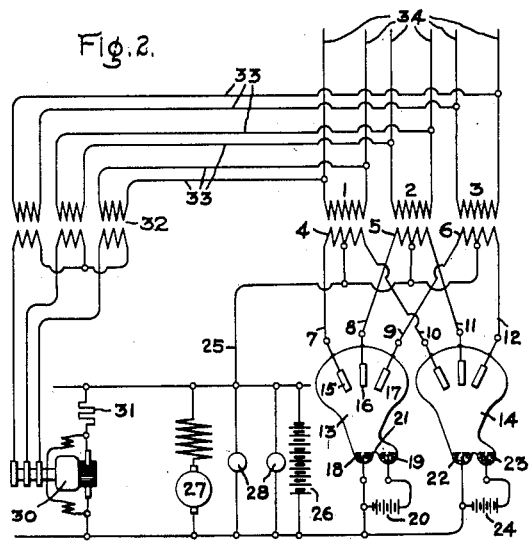
Figure 3:
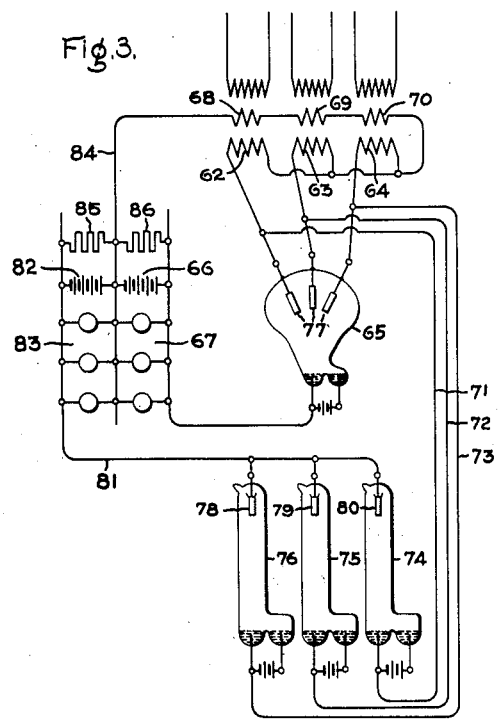

Figure 1 represents diagrammatically one embodiment of my invention; Fig. 2 a modified form, while Fig. 3 shows arrangements possessing various valuable improvements.

The novel features which characterize my invention I have pointed out with particularity in the appended claims.

In Fig. 1 I have represented a system for rectifying three phases of current. In this case the three-phase current is supplied through a set of three-phase transformers having primary windings 1, 2 and 3 and corresponding secondaries 4, 5 and 6. Two sets of three-phase leads 7, 8 and 9, and 10, 11 and 12 of opposite polarity, extend from opposite ends, respectively, of the three secondaries, the middle points of which are connected together to form a point of neutral potential. To each set of leads I connect a rectifying device, consolidated, so to speak, so as to form a single structure. One of these rectifying devices is indicated at 13 and the other at 14 and both being of the same construction a description of one is sufficient for both.

The device 13, for example, comprises a very highly exhausted receptacle or envelop, and communicating with the interior of this envelop are four main electrodes 15, 16, 17 and 18, and a supplementary or auxiliary electrode 19. All of these electrodes may be of mercury or of some other suitable vaporizable material, though in the present instance I find it convenient to make some of the electrodes, as for example, the upper electrodes 15, 16 and 17 of some solid material, such as iron, artificial graphite, steel, or the like. The mercury electrodes 18 and 19 are separated slightly from each other and the space between them forms the seat of an electric arc produced by a small storage battery 20 or other suitable source of direct current connected to the exterior terminals of the electrodes, this arc being initiated when the electrodes are brought into temporary electrical engagement with each other by shaping the tube so as to cause the mercury forming a portion of one or the other of the electrodes to run over the slight barrier 21 normally separating the bodies of mercury constituting the electrodes. A spark or arc once established by the means mentioned, or by any other means such as may be known to one skilled in the art, may be continued indefinitely and, by giving off ions or electrically conducting vapor, operates in such a manner as to cause a flow of current between the main electrodes of the device, due to the impressed alternating voltage. This flow of current, however, is not alternating but consists of a series of pulsations of one polarity, the effect being one in which all of the waves of the alternating current of a single polarity are completely suppressed, and the other waves allowed to pass. The other rectifying device 14 is similarly provided with a supplemental direct current source 24 for producing the auxiliary arc in the same manner as the arc or discharge is produced between the electrodes 18 and 19 of the device 13.

The rectifying device 14 which operates as a companion to the rectifying device 13 receives current from the set of mains 10, 11 and 12. It is started in the same manner as the rectifier 13, by means of an auxiliary arc maintained between the mercury cathode 22 and an auxiliary anode or electrode 23. This auxiliary arc receives its energy from a source of direct current such as a storage battery 24. The two negative electrodes 18 and 22 of the respective rectifying devices 13 and 14 are electrically connected as indicated, and a common return or neutral conductor 25 extends from a point of neutral potential of the alternating current system. This point of neutral potential is provided in the present instance by connecting the neutral conductor to a central point in each of the secondary windings 4, 5 and 6 as indicated.

In the circuit with the neutral or return conductor 25 I connect any direct current translating devices to which I may desire to supply the direct current produced by the rectifier. In the present instance I have represented a storage battery 26, as an example of such translating device, though it is to be understood that in place thereof or in conjunction therewith I may utilize any other suitable translating device, such for example, as direct current motors 27, arc or incandescent lamps 28, or the like.

When the arrangement shown in Fig. 1 is started into operation by means of the auxiliary arcs fed from the storage batteries 20 and 24, a series of waves or pulsations of current of one polarity flow through the rectifiers to the consumption circuit represented by the lamps, motors, and storage batteries and back through the neutral conductor 25 to the middle points of the secondary windings 4, 5 and 6. It will be evident therefore that a half wave of current will flow first in one half of each winding and then in the other half. The half waves which flow in one half the winding will magnetize in the opposite direction from the waves in the other half of the winding. A resultant alternating magnetization is constantly produced and the transformer core therefore does not become saturated as would be the case if the resulting magnetization were unidirectional. This latter effect would take place for example if the unidirectional current were fed into the neutral of Y-connected transformers, such for example as the usual Y-connections for three-phase transformers; and it is objectionable because it involves so large a flow of magnetizing current to the transformer as to render the transformer incapable of delivering, in the form of direct current, more than a very small proportion, say 7 to 10 per cent., of its rated output.

By reason of the connection above described, the secondaries 4, 5 and 6, though deriving energy from the three-phase source, supply six phase current. Waves of one polarity pass, for example, to the rectifier 13 and when these polarities reverse, waves pass to the other rectifier 14. The rectifiers 13 and 14 therefore to a certain extent constitute selective circuits. As a result of the action mentioned, the secondaries produce alternating reactions upon their corresponding primaries which, therefore, require no more than the usual amount of magnetizing current. If a secondary were to carry current during one-half wave and not during the other a unidirectional magnetization of the core of the transformer would occur and this would require an excessive magnetizing current to produce the requisite counter electro-motive force in the primary. By the arrangement described, this serious disadvantage which in practice may amount to practical inoperativeness, is avoided, while at the same time current waves are derived which are combined in the return circuit including the translating device so that a series of waves 120 degrees apart are superposed upon another similarly related series so that the tops of one set of waves overlap the low points of the other set of waves thus producing a six-phase succession of waves in the consumption circuit and a consequent higher degree of uniformity and steadiness of current.

When the auxiliary sources of current 20 and 24 are maintained in operation continuously to produce the auxiliary arcs in the rectifiers 13 and 14, it will be apparent that the translating devices in the consumption circuit may be entirely removed from circuit and that when again cut in, the rectifiers will start automatically. If, however, the starting means are not maintained in continuous operation, and it is not ordinarily necessary that they should be, I may connect a resistance 29 permanently in the consumption circuit, thus preventing the current from falling below a certain minimum value. The rectifiers are apt to cease operations if the current in the consumption circuit gets too low, and the value of the resistance in the consumption circuit is therefore chosen so that even if all the translating devices are out of circuit, the current will not fall below its minimum value. As such a resistance entails a continuous loss of energy, I find that I may replace it in part by an energy restoring device by which energy may be returned to the supply system. Such an arrangement is shown in Fig. 2 in which the energy restoring device, consisting in this instance of an inverted rotary converter 30, is connected in series with a relatively small resistance 31. This inverted rotary replaces a resistance large in comparision with resistance 31. The alternating current end of the rotary converter is connected by means of collector rings and leads to a set of three-phase transformers 32 which in turn are connected through leads 33 across the supply mains for the main transformer primaries 1, 2 and 3. The inverted rotary and the transformers 32 are adjusted relatively to each other so that the voltage impressed upon the direct current end of the inverted rotary tends to produce upon the mains 33 a voltage which is higher than that of the main supply conductors 34. By reason of this adjustment energy is received in the form of direct current and returned to the main circuit as alternating current, thus preventing the waste of energy which would otherwise occur in heating the resistance replaced by the inverted rotary.

Though I have shown the energy returning device in connection with Figs. 1 and 2, it is to be understood that it may be employed in connection with the system illustrated by Fig. 3. To avoid useless repetition, however, I have not illustrated it in Fig. 3.

In the system shown in Fig. 3 an arrangement is provided for utilizing both waves of current derived from a Y-connected system of transformers, the secondaries of which are indicated at 62, 63 and 64. A rectifier 65 of the same construction as that heretofore described, receives current from the Y-connected secondaries which, after passing through translating devices such as 66 and 67 returns through counter-magnetizing coils 68, 69 and 70 to the neutral of common connection of the Y-connected secondaries. From the leads extending to the rectifier 65 are branched a corresponding number of conductors 71, 72 and 73, which extend respectively to three rectifying devices 74, 75 and 76 all alike. Each of these devices comprises a highly exhausted receptacle of tubular form, though it may be understood that the form of the envelop may be widely varied without departing from my invention, and each is provided with two main electrodes and a supplemental or auxiliary electrode. As in the case of the other rectifiers herein described, all of these electrodes may be of mercury or of other suitable vaporable material, though in the present instance I find it convenient to make one of the electrodes, as for example, the upper electrode, of some solid material such as iron or artificial graphite. The starting means is essentially the same as that herein described in connection with the rectifiers of Fig. 1. Connections are made to these rectifiers 74, 75 and 76 so that current waves will pass through them of a polarity opposite from that of the waves passing to the rectifier 65. For that purpose leads 71, 72, and 73 are connected to the mercury electrodes of the rectifiers 74, 75 and 76 as distinguished from the connections of the same supply circuits to the carbon or non-vaporizable electrodes 77 of the rectifier 65. Waves of one polarity, therefore, pass into the rectifier 65 and waves of opposite polarity through the other rectifiers, whereby the secondaries 62, 63 and 64 of the supply transformers are at all times loaded with alternating current. The upper or non-vaporizable electrodes 78, 79 and 80 of the three single-phase rectifiers are joined together and the waves of current passing through are therefore combined to form a nearly steady direct current in the return conductor 81 by which current is conveyed to another set of translating devices, such as a storage battery 82 or lights 83. The two sets of translating devices are connected as indicated so that a three-wire system is formed, the neutral conductor of which is indicated at 84 and is connected as before intimated, to the circuit of the common magnetizing coils 68, 69 and 70 leading to the neutral of the Y-connected secondaries. It will be evident that when the loads on the two sets of the three-wire systems are equal, no current will flow over the neutral conductor 84. When, however, the loads become unequal, current will return to the neutral of the Y-connected secondaries and, when returning, its magnetizing effect in passing through the counter-magnetizing coils will counterbalance a unidirectional magnetization in the secondaries 62, 63 and 64 due to the inequality of the waves of one polarity with respect to the waves of opposite polarity. Resistance 85 and 86 may be connected across the three-wire system to fulfil in connection with rectifier 65, the functions fulfilled by resistance 29 of Fig. 1 with respect to its rectifiers 13 and 14.

Although in the foregoing description and in the figures of the drawings I have set forth certain specific embodiments of my invention, it is to be understood that various modifications thereof may be made without departing from my invention, for which reason I do not wish to be limited to the details shown.

What I claim as new and desire to secure by Letters Patent of the United States, is,

1. The combination of a multiphase alternating current system, a set of conductors connected respectively to a terminal of each phase of said system, a vapor rectifying device having anodes connected to said conductors, a second set of conductors connected respectively to a terminal of opposite polarity of each phase, a second vapor rectifying device having anodes connected to said second set of conductors and a direct current load circuit connected to the cathode circuit of each of said rectifying devices and to points of intermediate potential on the phases of said system.

2. The combination of a source of alternating current, a vapor rectifier therefor containing arc paths of constant length, a direct current circuit, means forming a permanent part of said circuit for insuring a flow of current from said source in said rectifier of a value above that at which the operation of the rectifier becomes unstable and translating devices in said circuit for utilizing the remaining part of the rectified current.

3. The combination of a source of alternating current, a vapor rectifier therefor, means for insuring a flow of current in said rectifier of a value above that at which the operation of the rectifier becomes unstable, and means for returning energy from the rectifier circuit to said source.

4. The combination of a source of alternating current supply, a mercury vapor rectifier fed therefrom having arc paths of predetermined length, an invariable current-receiving circuit for maintaining the amount of rectified current above a value at which the rectifier becomes unstable and translating devices for utilizing at will the remaining capacity of the rectifier.

5. The combination of a source of alternating current, a vapor rectifying device, a circuit supplied continuously by the rectifier with a predetermined amount of current, and means for returning energy from said circuit to the supply system.

6. The combination of an alternating current supply system, a vapor rectifier, an energy-consuming device and an energy-transforming device in circuit with said rectifier, and means for returning to the supply system energy received by the transforming device.

7. The combination of a source of alternating current, a consumption circuit containing removable translating devices, a mercury vapor rectifier having arc paths of constant length between said source and said consumption circuit, and permanently connected energy-receiving means for continuously keeping up the rectifier current when the current consumed by said translating devices is too low to maintain the rectifier in operation.

8. The combination of a source of alternating current, a consumption circuit containing devices taking a variable amount of current, a rectifier receiving energy from said source and supplying current to said consumption circuit, said rectifier being liable to cease operating when the energy transmitted from said source falls below a predetermined limit, and means forming a permanent part of said consumption circuit for insuring the continuous flow through said rectifier of sufficient current from said source to insure stability of the rectifier.

9. The combination of a source of polyphase current, a consumption circuit, containing translating devices removably connected therein, a rectifier which is self maintaining when the current in said consumption circuit is normal but unstable when said current is low, and a permanently connected current receiving means for continuously maintaining enough current from said source through said rectifier to keep the rectifier in stable operating condition.

In witness whereof, I have hereunto set my hand this 20th day of March, 1903.

CHARLES P. STEINMETZ.

Witnesses:
  EDWARD WILLIAMS, Jr.,
  HELEN ORFORD.